UNITED STATES PATENT OFFICE.

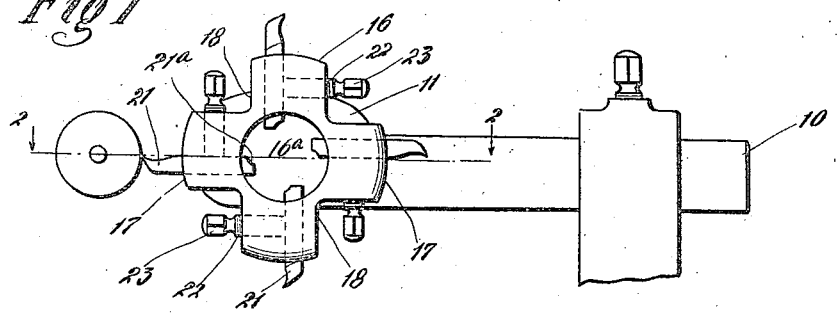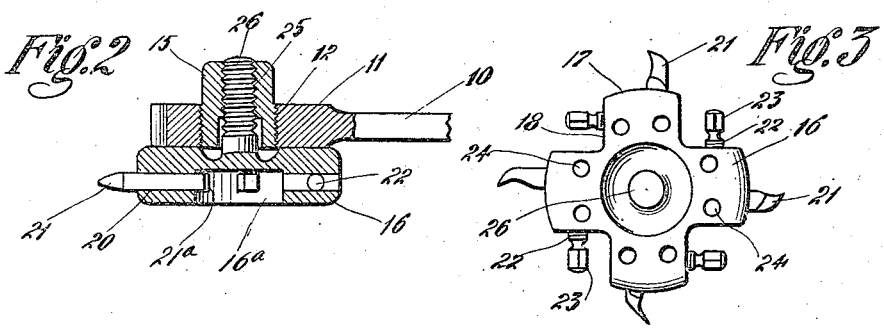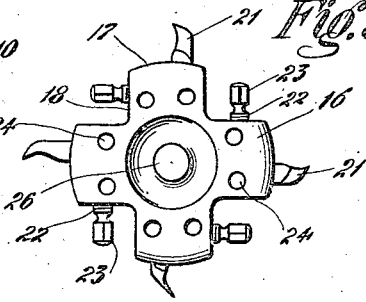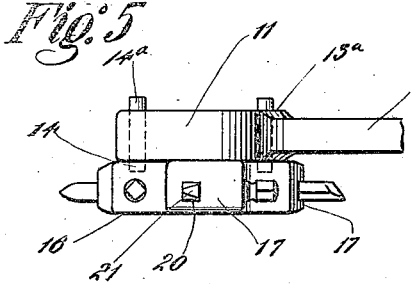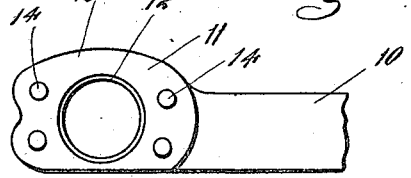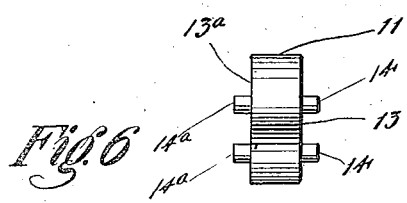

WALTER COCKCROFT, OF PHILADELPHIA, PENNSYLVANIA, ASSIGNOR OF ONE-HALF TO WILLIAM P. PAUL, OF PHILADELPHIA, PENNSYLVANIA.

TOOL HOLDER.

1,410,528.   Specification of Letters Patent.   Patented Mar. 21, 1922.

Application filed October 20, 1920. Serial No. 418,186.

*To all whom it may concern:*

Be it known that I, WALTER COCKCROFT, a subject of the King of England, residing at Philadelphia, in the county of Philadelphia and State of Pennsylvania, have invented certain new and useful Improvements in Tool Holders, of which the following is a specification.

This invention relates to tool holders and has for its object to provide in a tool holder of the general character used in machine shops for holding a plurality of metal cutting tools so arranged that a quick change can be made in the use of the several tools in order to substitute one for another, the principal object of the invention being to provide such a device whereby a change from one kind of tool to another can be made without moving the tools from their original fixed position.

Another object of the invention is to provide a tool holder so constructed that a change from one kind of tool to another may be made without removing the work from the lathe, chuck or other machine on which it may be carried.

A still further object of the invention is to provide a tool holder for carrying a plurality of cutters or other tools and having means whereby quick ejectment of the tools from the holder may be had.

Another object of the invention is to provide a tool holder for accommodating a series of "bits" or cutters which can be promptly released from locked engagement on its supporting shank and turned to a different required position and quickly relocked thereon with a minimum expenditure of time and labor.

Another object of the invention is to provide a tool holder so constructed that it may be clamped close up to the tool post.

A still further object of the invention is to provide in a tool in combination with a tool holding post means whereby the tool holder may be automatically disconnected therefrom.

With the above and such other objects in view as will hereinafter more fully appear I have invented the device illustrated in the accompanying drawings in which—

Figure 1 is a side elevational view of the tool holder shown in operative position.

Figure 2 is a sectional view taken on line 2—2, Figure 1.

Figure 3 is an elevational view of the tool holder taken from its inner side.

Figure 4 is a detail elevational view of a shank head upon which the tool is supported.

Figure 5 is a plan view of the tool holder and its supporting head and

Figure 6 is an end elevation of a shank or tool post head.

Like reference characters indicate like parts throughout the following specification and in the several views in the drawings in which 10 indicates a shank or tool post provided at one end with an enlarged head 11, having a transverse threaded opening 12. The face 13 of the enlarged portion 11 is provided with preferably four suitable spaced apart pins or studs 14 projecting therefrom. Threaded into the opening 12 is a substantially tubular interiorly and exteriorly threaded nut 15, the threads on the outer face of the nut being smaller and therefore more to the inch than the threads on the inner face of the nut.

A tool head 16 of an irregular but somewhat cruciform shape is provided, thus forming projections 17 and notches 18, each projection being provided with a squared opening 20 for the passage of a tool 21, set screws 22 being threaded into the projections 17 at substantially right angles to the passages 20, therein, so that the heads 23 of the set screws will lie in the notches 18, the inner ends of the set screws engaging with the tools 21, extending through the passages, to lock the tools 21 rigidly to the head. One face of the head 16 is provided with a series of holes 24 which are adapted to receive the pins or studs 14; and the outer face thereof is recessed at 16ª so that free access can be obtained to the inner ends 21ª of the tools or cutters 21, to remove any particular one when it is worn down or becomes jammed in its housing or passage 20 as often occurs due to small turnings and dust working thereinto.

Referring to the views it will be seen that different kinds or shapes of tools can be carried on the head if desired and that when the head is rotated a different tool can be brought into operating position. It will be apparent that when the nut 15 is partially unscrewed from the enlarged portion of the shank, that this operation will simultaneously move the head away from the enlarged portion by reason of the relatively large thread 25 on a stem 26 projecting from the inner face of the head and normally engaging with the internal thread of the nut and when the head is moved sufficiently away from the enlarged portion of the shank to clear the pins or studs 14, ready rotation of the head can be obtained. By simply tightening up the nut 15 in the enlarged portion of the shank, the stem 26 of the head will recede into the nut drawing the head toward the enlarged portion of the shank and causing the pins or studs 14 to be received in diametrically opposed holes 24 or 24ª, thus rigidly locking the head to the shank and securing the desired tool on the head in position for operation upon the work at hand.

In order to more effectually insure the quick connection and disconnection of the tool holder 16 to and from the shank head 11, I preferably provide the stem 26 with two or more screw threads thereon so that a half, quarter or smaller turn of the nut 15 causes engagement of its thread thereon, and vice versa, a quicker release of said parts is effected due to the increased pitch of the threads on said stem 26 when two or more are provided. In other words, by providing the stem 26 with two or more threads, a double or multiple-lead is insured as between said stem and the nut 15.

With this construction it will be apparent that the shank can be substantially held in the usual tool holder of a lathe or the like, while the head is manipulated to bring another tool into operating position and that in this connection the work to be operated upon can also be left in its position and need not necessarily be removed from the chuck of the lathe or work holding element. The provision of the coarse and fine threads on the nut and stem insure quick and ready movement of the head toward or away from the shank when moving the head into or out of locked relation with the pins or studs on the enlarged portion of the shank and the comparatively few parts employed to bring about the desired construction provide for a device that can be quickly and effectively handled and cheaply manufactured to accomplish the desired result.

In Figure 5 each face 13ª of the enlarged portion 11ª of the shank is provided with pins or studs 14ª to co-operate with opposed holes 24ª in the tool head 16ª. With this construction the tool head can be mounted against either side of the enlarged portion or head of the shank so that the tool head is in fact reversible as to the part which holds up and locks it rigidly against movement.

In the common form of tool holder it is necessary to entirely disengage the nut from the tool holding device to bring another tool into position as a rotary movement cannot be effected while head is engaged to shank owing to interference between the cutters and the housing, when the head is clamped close up to said housing. In the above construction this difficulty is obviated, as the nut still remains as part of the shank, while the head is entirely disengaged owing to the nut 15 being exteriorly, and interiorly threaded, the exterior being finer threaded than the interior; further, the interior thread being multiple in leads correspondingly with the threads on stem 26, re-engagement takes place in the several positions when the nut is actuated.

From the foregoing it will be readily seen that by my invention I provide a tool holder which provides for the disengagement of the desired part only, all other parts remaining in position, providing a means to readily and easily change to various forms of tools, tool holding heads, or other accessories, without changing their original setting.

Having now fully described my invention that which I claim to be new and desire to procure by Letters Patent is—

1. The described device consisting of a shank having a head with a threaded opening, a tool holder having a threaded post and a nut internally and externally threaded for securing said members together; said external threads being finer than said internal threads for the purpose explained.

2. The described device consisting of a shank having a head with a threaded opening, a tool holder having a threaded post and a nut internally and externally threaded for securing said members together, said external threads being finer than said internal threads for the purpose explained, said tool holder having openings therethrough to receive tools and a recess into which ends of said tools project whereby said tools may be forced from said holder.

3. In a device of the character described a shank having an enlarged double faced head, pins projecting from each face thereof, a tool holder having recesses in each face thereof to receive said pins and means whereby said holder may be secured to said head, said means including means whereby the holder may be drawn to or moved away from said head, said means consisting of a nut, said nut being threaded into said head, said means including relatively fine external threads on said nut and relatively coarse internal threads on said nut and a screw on said holder for screwing into said relatively large threads.

In testimony whereof I affix my signature in the presence of two witnesses.

WALTER COCKCROFT.

Witnesses:
CHRISTOPHER CONRAD MAYER,
WILLIAM MOIR.